United States Patent
Thumm et al.

(10) Patent No.: US 7,396,067 B2
(45) Date of Patent: Jul. 8, 2008

(54) REAR-WINDOW ROLLER BLIND WITHOUT RESIDUAL OPEN GAP

(75) Inventors: Andreas Thumm, Nurtingen (DE); Fekadu Kebede, Ostfildern (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/545,152

(22) Filed: Oct. 10, 2006

(65) Prior Publication Data
US 2007/0095489 A1 May 3, 2007

(30) Foreign Application Priority Data
Nov. 2, 2005 (DE) ........................ 10 2005 052 618

(51) Int. Cl.
*B60J 3/02* (2006.01)
(52) U.S. Cl. ................ 296/143; 296/97.8; 160/370.22; 160/270
(58) Field of Classification Search ................ 296/143, 296/138, 97.8; 160/370.22, 270
See application file for complete search history.

(56) References Cited

U.S. PATENT DOCUMENTS

| | | | | |
|---|---|---|---|---|
| 5,067,546 A | * | 11/1991 | Jeuffray et al. ............. | 160/23.1 |
| 6,347,825 B2 | * | 2/2002 | Seel et al. .................. | 296/97.8 |
| 6,547,307 B2 | * | 4/2003 | Schlecht et al. ............ | 296/97.4 |
| 7,059,651 B2 | * | 6/2006 | Bohm et al. ............. | 296/97.11 |
| 7,089,992 B2 | | 8/2006 | Walter et al. | |
| 2004/0012225 A1 | * | 1/2004 | Schlecht et al. ............. | 296/143 |
| 2004/0144506 A1 | | 7/2004 | Walter et al. | |

FOREIGN PATENT DOCUMENTS

DE  10064513 A1 * 8/2001
DE  10248591 A1   5/2004

* cited by examiner

*Primary Examiner*—Dennis H. Pedder
*Assistant Examiner*—Melissa A Black
(74) *Attorney, Agent, or Firm*—Leydig, Voit & Mayer, Ltd

(57) ABSTRACT

A rear window roller blind for motor vehicles which has a pull rod assembly with a contoured plate. The contoured plate is used to close the segmented residual gap between the straight pull rod assembly and the curved top edge of the rear window. In order for the contoured plate to lie flush with a rear shelf below the rear window when the roller blind is in a retracted position, it is pivotable about a longitudinal axis of the pull rod assembly during movement of the pull rod between its retracted and extended positions. Such rotational movement is controlled by the contour of guide rails within which the pull rod is guided during such pull out movement.

26 Claims, 4 Drawing Sheets

REAR-WINDOW ROLLER BLIND WITHOUT RESIDUAL OPEN GAP

FIELD OF THE INVENTION

The present invention relates generally to window roller blinds for motor vehicles, and more particularly, to motor vehicle window roller blinds that are automatically extendable and retractable.

BACKGROUND OF THE INVENTION

Window roller blinds in motor vehicles are used for the purpose of reducing interior heating in order to minimize air-conditioning system requirements. In terms of direct sun irradiation, in the summer when the sun rises high in the sky, the rear window is especially vulnerable because it lies relatively flat. Depending on the driving direction, sunlight nearly always comes through the rear window and the exposed parts of the vehicle beneath the rear window are heated significantly. Therefore, rear-window roller blinds have become relatively widely used in vehicles.

In a known rear-window roller blind shown in DE 102 48 591 A1, a rotatably supported wind-up shaft is located underneath a rear shelf below the window. A roller blind is fixed to the wind-up shaft with one edge, and the roller blind can be pulled out through a slot in the rear shelf. The slot divides the rear shelf into two parts, namely one part that is adjacent to the rear seat back and one part that borders the rear window. In the inner lining of the C-column of the vehicle body for a four-door vehicle, there are two mirror-inverted guide rails, which extend into the space under the rear shelf directly in the region of the slot in the rear shelf. The top edge of the guide rails lies flush underneath the top roof edge of the rear window. The two mirror-inverted guide rails are used for guiding movement of a pull rod assembly to which the roller blind is fixed at its opposite edge.

The pull rod assembly is straight and adjustable in its longitudinal length. It can be moved from a rest position, in which the slot in the rear shelf is essentially closed, into a functional position, in which the rear window is essentially shaded. In the functional position, the pull rod assembly is located at the top end of the two guide rails.

The known roller blind is activated with the aid of linear push elements which are guided in the guide rails safe from buckling and which are driven by means of an electric motor. The wind-up shaft is biased with a spring motor in order to maintain a constant tensile stress in the roller blind in a wind-up direction.

Due to the curvature of the roof and, correspondingly, the curved upper edge of the rear window, when the roller blind is extended, there is still a light gap between the pull rod assembly and the upper edge of the rear window. The gap is unavoidable in the known arrangement due to the straight profile in the pull rod assembly. On the other hand, a straight profile on the pull rod assembly is desirable because this creates the most favorable installation and wind-up relationships.

OBJECTS AND SUMMARY OF THE INVENTION

It is an object of the present invention to provide a window roller blind for motor vehicles, and particularly a rear-window roller blind, in which no light gap remains between a straight pull rod assembly and a curved window edge when the roller blind is in an extended functional position.

In the inventive roller blind, as in the state of the art, a wind-up shaft is provided, to which a roller blind is fixed with one edge. The roller blind is drawn out through a slot, which is contained, for example, in a rear shelf or a roller blind housing. The end of the roller blind away from the wind-up shaft is fixed to a pull rod assembly. The pull rod assembly is guided and carried with the aid of guide means over its entire path of travel between the rest position for a retracted roller blind and the functional position for an extended roller blind. At least the wind-up shaft is pre-tensioned for maintaining a tension in the roller blind.

In order to cover the gap which remains when the pull out assembly is in the functional position and through which light penetrates if unobstructed, the pull rod assembly is provided with a contoured plate with an edge shaped with a convex curve. Such plate closes the otherwise present segmented gap between the pull rod assembly and the top edge of the window. For this purpose, the pull rod assembly is pivoted about an axis which lies parallel to its longitudinal length. In this way it is assured that the contoured plate with the convex edge lies flat next to the slot in the rest position of the pull-out profile and does not project upwardly. On the other hand, the pull rod assembly is moveable to the functional position in a pivoted position such that the residual light gap can be covered with the smallest possible projection of the contoured plate.

The pull rod assembly is adjustable in length. In this way, it also can be used in windows in which the width of the window changes in the direction of the movement of the roller blind towards its functional position. In this regard, the pull rod assembly can be provided with guide elements on its end whose longitudinal distance from each other is variable.

The guide elements further can be shaped so that they forcibly set the rotated angular position of the pull rod assembly about its longitudinal axis. For this purpose, the guide means can have elongated guide elements with spherical ends which are removeable along the guide rail. Good guidance of the pull rod assembly is obtained when it is guided at its opposite ends.

Each guide rail can contain a guide groove which, when viewed in cross section, defines a groove chamber and a groove slot. If the groove slot has a smaller width than the groove chamber, a back-cut guide groove is produced which can be used for buckle-proof guidance of the push elements.

The drive device preferably includes an electric motor so that the roller blind can be activated remotely. However, manual activation is still possible, wherein it is then sufficient to house a spring motor in the wind-up shaft.

To transfer the activation force from the electric motor to the roller blind, linear activation elements can be provided which run through the guide rails. The activation elements preferably are constructed in the form of push elements. For moving the activation elements, there are linear drive means which convert rotational movement of the electric motor into a linear movement.

The contoured plate of the pull rod assembly can be either formed in one piece with the pull rod assembly, or it can be separate from the pull rod assembly and attached to the pull rod assembly. The contoured plate preferably is elastic so that it can adapt to the contours in the roof region. In order for the rear shelf to be as smooth and flat as possible after retracting the roller blind, it is formed with a recess or depression which is adapted to the shape of the contoured plate so that the contoured plate largely disappears and flush with the upper side of the rear shelf.

Other objects and advantages of the invention will become apparent upon reading the following detailed description and upon reference to the drawings, in which:

BRIEF DESCRIPTION OF THE DRAWING(S)

Figure 4:
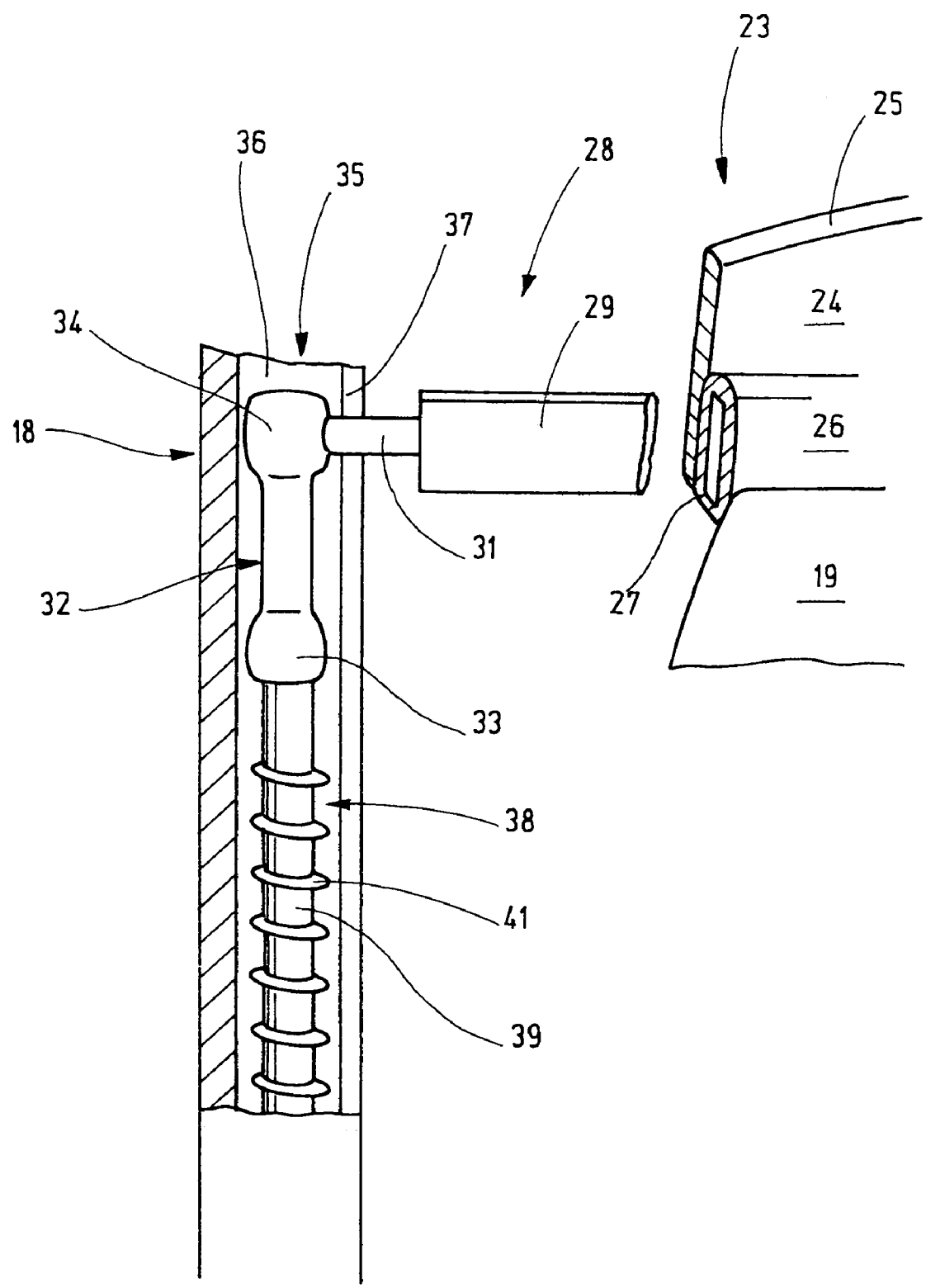
Figure 5:
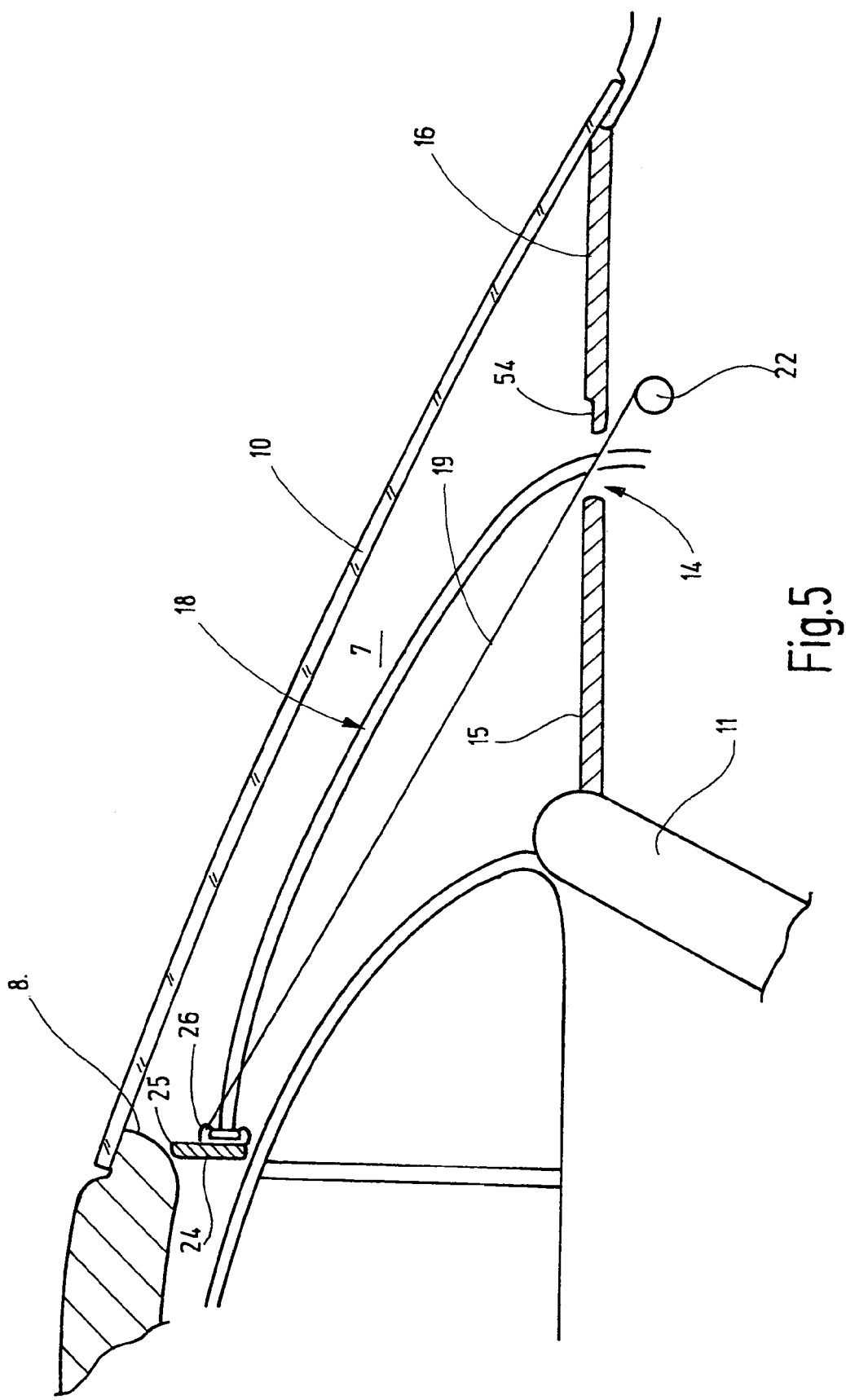

FIG. 4 is an enlarged fragmentary section of the guide elements and guide rail for guiding movement of the roller blind between extended and retracted positions; and FIG. 5 is an enlarged fragmentary perspective showing the pull out assembly of the illustrative roller blind in an extended and pivoted position substantially closing any gap between the pull out assembly and the upper edge of the motor vehicle window.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
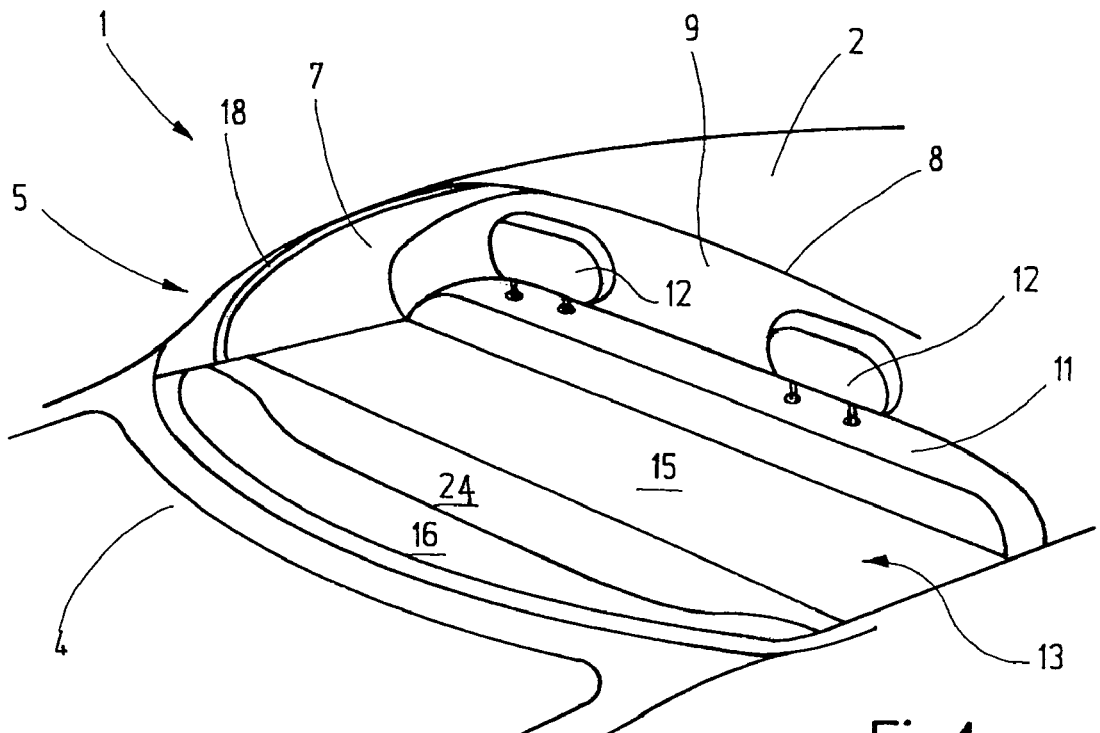
FIG. 1 is a diagrammatic depiction of part of a motor vehicle having a rear window roller blind in accordance with the invention, in this instance, shown in a retracted position.

Referring now more particular to FIG. 1 of the drawings, there is shown a rear section 1 of a motor vehicle sedan having a rear window roller blind in accordance with the invention. The illustrative motor vehicle has a roof 2, a trunk lid 4, and C-shaped columns 5 having a lining 7 disposed between the trunk lid 4 of the motor vehicle and the roof 2. Between the C-shaped columns 5, a rear edge 8 of the roof 2 and, a top side of the trunk 4, a rear window cut-out 9 is defined in which a rear window 10 (FIG. 5) is located. Between the bottom edge of the rear window cut-out 9 and the rear side of a rear seat bench 11 with head supports 12, a rear shelf 13 extends approximately horizontally. A slot 14 (FIG. 5), which divides the rear shelf 13 into a front section 15 and a rear section 16, runs transversely through the rear shelf 13. Laterally next to the slot 14, two mirror-shaped guide rails 18 are integrated into the inner lining parts 7 of the C-columns 5. The mirror shaped guide rails 18 extend in opposed relation to each other from underneath the slot 14 into the vicinity of the roof rear edge 8 in laterally adjacent relation to the rear window cut-out 9.

Figure 2:
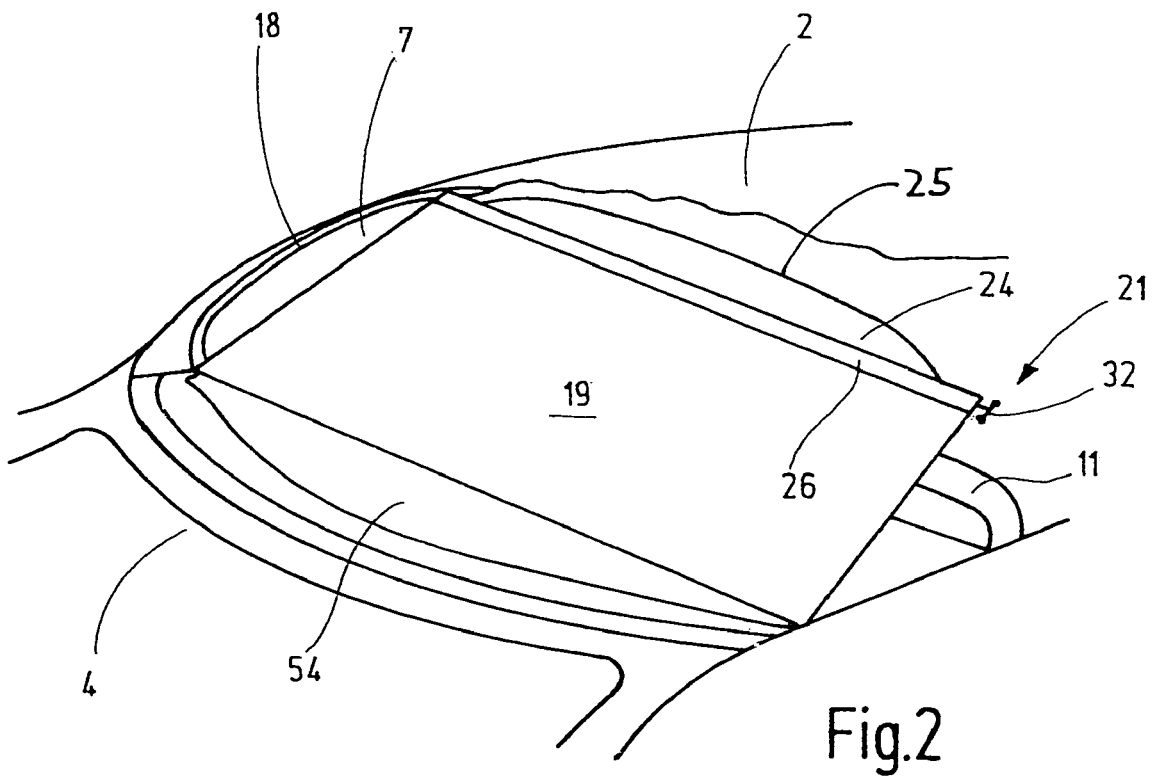
FIG. 2 is a diagrammatic depiction, similar to FIG. 1, showing the rear window roller blind in an extended position adjacent the rear window of the motor vehicle.
Figure 3:
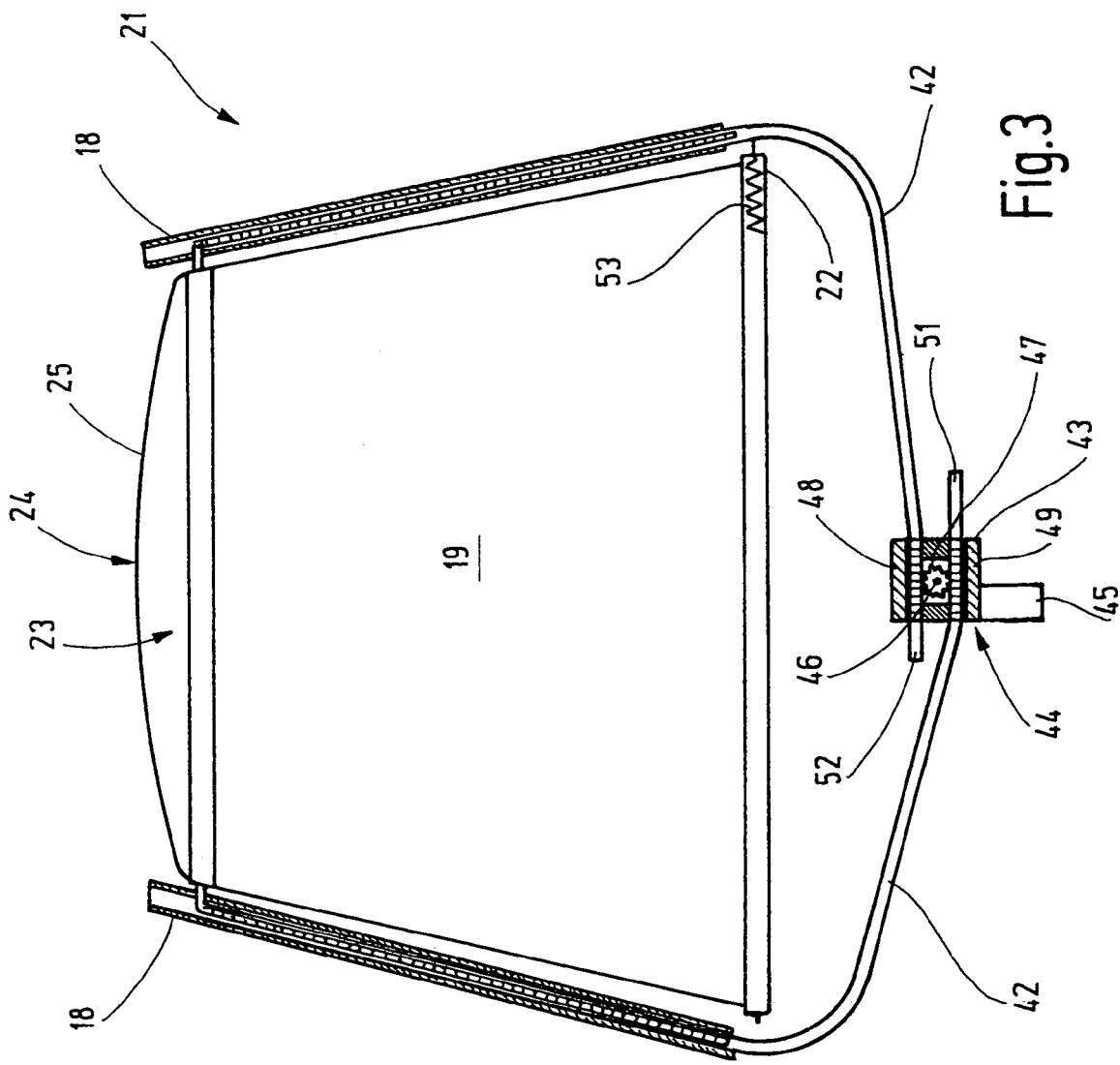
FIG. 3 is a diagrammatic depiction of the actuating mechanism for moving the roller blind between extended and retracted positions.

A roller blind 19 of a rear window roller blind assembly 21 is extendable through the slot 4. When the roller blind 19 is in a retracted position, as depicted in FIG. 1, the slot 14 is generally covered. When in an extended position, as depicted in FIG. 2, the roller blind has an approximately trapezoidal outline that expands as a largely flat surface underneath the rear window 10. In the extended position, the roller blind 19 reaches to the vicinity of the rear edge 8.

The guide rails 18 approximately follow the side contours of the rear window 10, initially beginning with a vertical section that extends perpendicular to the plane of the rear shelf 13. The two guide rails 18 extend with increasingly horizontal components toward their top ends.

In accordance with the invention, a contoured plate 24 is mounted on the pull assembly 23 and has a curved edge 25 pointing away from the pull rod assembly 23. Accordingly, a light-gap otherwise possibly remaining between the rear edge 8 or the top edge of the rear window 10 and the straight pull rod assembly 23 is to be covered with the contoured plate, as will become apparent below.

The pull rod assembly 23, as depicted in FIG. 4, includes a center or middle piece 26 on to which the outer edge of the roller blind 19 is anchored. The center piece 26 in this case is tubular having a hollow space 27, which is rectangular when viewed in cross section, and which extends through the center piece 26 with a constant cross section. The contoured plate 24 is fixed to a flat side of the middle piece 26 pointing away from the viewer.

In each end of the hollow space 27 of the center piece 26, a guide element 28 is guided for relative longitudinal movement. The guide element 28 comprises a guide piece 29 having a throat part 31 molded onto the guide piece. The guide piece 29 is dimensioned in cross section so that it slides with little play in the hollow space 27, but cannot rotate about the longitudinal axis. Thus, only a telescoping motion, with no rotational motion, is possible. In other words, if the guide piece 29 is turned about the longitudinal axis, the middle piece 26 and thus the entire pull rod assembly 23 also are forcibly turned about the longitudinal axis.

The throat part 31 in this instance is a straight cylindrical peg which is rigidly connected to a slide 32 at its other end. As shown, the slide has an elongated shape, i.e., its longitudinal length being greater than its transverse width, and it is narrower in the middle. The slide 32 thus has, viewed overall, a symmetrically round, dumbbell-shaped or dog-bone-shaped construction with two thick ends or heads 33, 34. The top head 34, as shown in FIG. 4, is fixed to the throat part 31 and rotatable therewith.

For holding the slide 32, each of the guide rails 18 has a guide groove 35. The guide groove 35 is defined by a groove chamber 36 having a circular cross section and a groove slot 37. The groove slot 37 has a smaller width than the groove chamber 36 so that, overall, a back-cut guide groove 35 is produced. The width of the groove slot 37 corresponds to the diameter of the throat part 31.

Travel of the roller blind 19 is effected with the aid of linear push elements 38 which each are guided in buckle-proof fashion in a respective groove chamber 36. It can, but is not absolutely required, that each pusher element be connected at its free end to respective slide 32 in a tension- and compression-proof manner. In this case, as will be apparent to a person skilled in the art, a compression resistant connection is sufficient.

Each push element 38 is constructed from a flexible cylindrical core 39 with a spiral 41 located about the core. The spiral 41 effectively forms a circular tooth so that the push element 38 overall has the shape of a spiral-toothed, elastically flexible rack.

At the bottom end of each guide rail 18 a guide tube 42 is attached, which ends at a gear housing 43 of a gear motor 44. The gear motor 44 has a permanently excited DC motor 45, which drives, via an intermediate gear, an output shaft 46 that carries and drives an output gear 47. Two boreholes 48,49 lead tangentially through the gear housing next to the output gear 47 and are aligned with the guide tubes 32, as shown. A storage tube 51 or 52 attaches to each side of the borehole 48, 49 facing away from the guide tube 42.

The teeth of the output gear 47 are adapted to the "teeth" of the two push elements 38 in order to obtain a positive-drive connection between the push element 38 and the output gear 47. The gear motor 44 acts with the toothed section of the push element 38 as a linear drive, while the length of the push element 38 that remains constantly in the guide tube 42 does not need teeth.

Finally, a spring motor 53 is provided in the wind-up shaft 22 which pre-tensions the wind-up shaft 22 in the sense of winding the roller blind 19 onto the wind-up shaft 22.

The operation of the rear-window roller blind 21 is as follows:

In the retracted state, the roller blind 19 is wound as much as possible onto the wind-up shaft 22 due to the effect of the spring motor 53. In this position, the pull rod assembly 23 lies in the slot 14, while the contoured plate 24 lies next to the slot 14, as FIG. 1 shows, on the rear part 16 of the rear shelf 13. This position is enabled because the two push elements 38 have been pushed back far enough into the associated storage tubes 51, 52 from the two guide rails 18 with the aid of the gear motor 44.

In order that the desired relative position between the pull rod assembly 23 or the contoured plate 24 and the rear shelf 13 is obtained, the profile of the guide rail 18 in each region where the guide rail 18 dips downwardly at the rear shelf 13 is adapted accordingly to the rotated angular position of the longitudinal axis of the slide 32, and thus, of the center piece 26 opposite the contoured plate 24. It will be seen that the orientation of the elongated dumbbell-shaped slides 32 defines the rotated angular position of the pull rod assembly 23 relative to the longitudinal axis of the two guide rails 18.

In order to move the roller blind 19 out of this retracted position in which the rear window 10 is not shaded, and into the functional position shown in FIG. 2, the gear motor 44 is set into operation by the user. The output gear 47, which meshes with the two push elements 38 in a positive-drive connection, pushes these elements forward in the direction towards the appropriate guide rail 18. Because both push elements 38 are coupled to the same output gear 47, but on diametrically opposite sides, the push elements 38 move from the gear motor 44 in opposing directions, but at the same speed. By this movement, they carry along the associated slides 32 with their ends running in the respective guide rail 18 and push the slide before them. The pull rod assembly 23 is thus moved on both sides by the same amount per unit time from the slot 14 upwardly to the rear edge 8, which coincides with the window top edge.

Because the slides 32 have an elongated construction, their longitudinal axis always coincides with the longitudinal axis of the guide rail 18 at the relevant position. The guide rails 18 transition, as explained above, starting from an approximately vertical section, in the vicinity of the slot 14, gradually into a region in which they have a strong horizontal component in their course, which is why the pull rod assembly 23 turns during the motion along the guide rails 18 about an axis that is parallel to its longitudinal axis. This has the consequence that the originally horizontally aligned contoured plate 24 becomes increasingly upright or the pull rod assembly 23 together with the contoured plate 24 approaches the window top edge 18. At the end of the pulling-out motion, the contoured plate 24, as FIG. 5 shows, stands more or less vertically.

At the functional position of the pull rod assembly 23, the roller blind 19 is tensioned in front of the greatest portion of the rear window 10 in the region between the slot 14 and the window top edge 8. The top ends of the two guide rails lie approximately in the vicinity of the upper corners of the rear window 10. In this position, without the contoured plate 24 between the pull rod assembly 23 and the window top edge 8, a segmented gap would remain due to the curvature of the rooftop which is not covered. This gap, which exists in prior art roller blinds, is closed by the inventive contoured plate 24. The free edge 25 of the contoured plate 24 is shaped accordingly in order to close the gap remaining between the straight pull rod assembly 23 and the window top edge 8.

In the movement from the rest position into the functional position, as FIG. 5 shows, the pull rod assembly 23 together with the contoured plate 24 has turned by approximately 90°. The formerly horizontal contoured plate 24 now stands largely upright. In this position, the contoured plate 24 is connected with a positive fit because the pull rod assembly 23 was turned by the effect of the slides 32 in the guide rails 18. Their azimuthal alignment relative to the longitudinal axis of the guide rail 18 at the appropriate position is forcibly fixed by the elongated slides 32. The slides 32 prevent the pull rod assembly 23 from assuming a tilted position due to the tension of the roller blind 19. The pivoting motion performed by the slides 32 in their course movement along the guide rails 18 is positively transmitted through the flat-edged connection of the guide piece with the center piece 26 of the pull rod assembly 23, and thus, also is transferred to the contoured plate 24.

The pivoting motion of the pull rod assembly 23 about its longitudinal axis during the extension of the roller blind is reversed in the retracting movement. For retracting roller blind, the gear motor 44 is set in motion in the opposite direction of rotation in order to pull the push elements 38 back from the guide rails 18. In this way, the slides 32 are pulled back if they are connected to the free ends of the push element 38 or they move alone due to the tensioning force of the spring motor 53 when the push elements 38 retract.

It will be understood by a person skilled in the art that the angular position that the longitudinal axis of the slides 32 relative to the plane defined by the contoured plate 24 depends on under an angle the guide rail runs in the surroundings of the rear shelf 13 and by which amount the contoured plate 24 is to be aligned in the functional position, as shown in FIG. 5. This, in turn, is also a function of the angle of the axis of the guide rail 18 relative to the vertical. This can be determined empirically in particular installation.

The contoured plate 24 can be a rigid plate which is connected with a force fit with the center piece 26. It also can be produced in one piece with the center piece 26. The contoured plate 24 also can be made from an elastically flexible material so that they readily conform to the edge of the window edge 8 in the functional position.

To obtain the flattest possible configuration when the roller blind 21 is retracted, a depression 54 can be formed in the rear section 16 of the rear shelf 13. The depression 54 holds the contoured plate 24 when the pull rod assembly 23 is inserted into the slot 14. The surface, which then forms the upper side of the contoured plate 24, lies flush with the upper side of the rear shelf 13.

From the foregoing, it can be seen that a rear-window roller blind for motor vehicles is provided in which the pull rod assembly has a contoured plate. The contoured plate is used to close the segmented residual gap between the straight pull rod assembly and the curved top edge of the rear window. In order that the contoured plate is flush with the rear shelf in the retracted position, during the extended movement it rotationally moves about a longitudinal axis to gradually adapt to the proper position. This movement is controlled by the course of the guide rails in which the pull rod assembly is guided.

The invention claimed is:

1. A roller blind assembly (21) for a window (9, 10) in a motor vehicle (1) having a curved top window edge (8) and a roller blind pullout slot (14) adjacent a bottom window edge comprising:
   a windup shaft (22) supported for rotational movement below said pullout slot (14),
   a roller blind (19) connected at one end to said windup shaft (22);
   a pull rod assembly (23) fixed to an end of the roller blind (22) opposite the windup shaft (19) for pulling the roller blind (19) out through said pullout slot (14);
   said pull rod assembly (23) being moveable along a pull out path from a rest position with the roller blind (19) in a substantially wound condition about said windup shaft (22) and a functional position in which the roller blind (19) is pulled out from said windup shaft (22) in front of said window;
   a drive (44) for moving said pull rod assembly (23) between said rest and functional positions,
   at least one guide member (18) for guiding movement of the pull rod assembly (23) along the pullout path between said rest and functional positions and which pivots the pull rod assembly about an axis parallel to a longitudinal axis of the pull rod assembly (23) such that the pull rod assembly is disposed in a first pivoted position when in said rest position and in a second pivoted position different from said first pivoted position when in said functional position, and
   said pull rod assembly (23) including a rectilinear rod member to which said opposite end of said roller blind is affixed and a contoured plate (24), said contoured plate having a curved edge (25) that is positionable relative to a top curved window edge (8) when said pull rod assembly (23) is in said functional position such that the contoured plate (24) substantially closes any light gap between the pull rod assembly (23) and the top window edge (8) when the pull rod assembly is in said functional position.

2. The roller blind assembly of claim 1 in which said contoured plate has a convexly curved edge.

3. The roller blind assembly of claim 1 including a spring motor for tensioning said windup shaft in a direction for winding up the roller blind (19) onto the windup shaft.

4. The roller blind assembly of claim 1 in which said rectilinear rod member is adjustable in length.

5. The roller blind assembly of claim 1 in which said rectilinear rod member has end guide elements (28) that are adjustable in a longitudinal direction of the pull rod assembly.

6. The roller blind assembly of claim 1 in which said rectilinear rod member includes a centerpiece (26) and two guide elements (28) disposed at opposite ends of the centerpiece (26), said guide elements (28) being moveable longitudinally with respect to a longitudinal axis of said centerpiece (26) while fixed against relative rotational movement with respect to the centerpiece (26).

7. The roller blind assembly of claim 5 in which said guide elements (28) cooperate with a pair of said guide members (18) to locate a rotated angular position of the rectilinear rod member and contoured plate about a longitudinal axis of the rectilinear rod member upon movement of the pull rod assembly along the pull out path.

8. The roller blind assembly of claim 7 in which said guide elements (28) each have a respective elongated slide (32).

9. The roller blind assembly of claim 8 in which said slides (32) each have a spherical shaped portion.

10. The roller blind assembly of claim 8 in which said guide elements each have a pair of longitudinally spaced apart spherical shaped portions.

11. The roller blind assembly of claim 1 including two said guide members (18) disposed at opposite ends of said pull rod assembly, said guide members each comprising a guide rail.

12. The roller blind assembly of claim 11 in which each said guide rail (18) has a guide groove (35) which in cross section defines a groove chamber (36) and a groove slot (37).

13. The roller blind assembly of claim 12 in which said guide slot (37) is smaller in width than the groove chamber.

14. The roller blind assembly of claim 1 in which the drive (44) includes an electric motor (45).

15. The roller blind assembly of claim 11 including linear activation elements (38) driven by said drive (44) for movement through said guide rails (18), said activation elements (38) each being operably connected at one end with said pull rod assembly (23).

16. The roller blind assembly of claim 15 in which said activation elements (38) are push elements which are guided in said guide rails free from buckling.

17. The roller blind assembly of claim 16 in which said push elements travel through guide chambers (36) defined by said guide rails (18).

18. The roller blind assembly of claim 15 including linear drive means driven by said drive (44) for moving said activation elements (38).

19. The roller blind assembly of claim 1 in which said contour plate (24) and rectilinear rod member are separate parts fixed to each other.

20. The roller blind assembly of claim 1 in which said contour plate (24) is formed as an integral part of the rectilinear rod member.

21. The roller blind assembly of claim 1 in which said contour plate 24 is elastically flexible.

22. A motor vehicle comprising:
   a motor vehicle body, a window (9,10) mounted in the motor vehicle body having a curved top edge, a panel adjacent a bottom edge of the window formed with a roller blind pull out slot (14), a roller blind assembly (21) including a windup shaft (22) supported for rotational movement below said pull out slot (14),
   a roller blind (19) connected at one end to said windup shaft (22);
   a pull rod assembly (23) fixed to an end of the roller blind (22) opposite the windup shaft (19) for pulling the roller blind (19) out through said pullout slot (14);
   said pull rod assembly (23) being moveable along a pull out path (19) from a rest position with the roller blind in a substantially wound condition about said windup shaft (22) and a functional position in which the roller blind (19) is pulled out from said windup shaft (22) in front of said window;
   a drive (44) for moving said pull rod assembly (23) between said rest and functional positions,
   guide members (18) which guide movement of the pull rod assembly (23) along the pullout path between said rest and functional positions and which pivots the pull rod assembly about an axis parallel to a longitudinal axis of the pull rod assembly such that the pull rod assembly is disposed in a first pivoted position when in said rest position and in a second pivoted position different from said first pivoted position when in said functional position, and
   said pull rod assembly (23) including a rectilinear rod member to which said opposite end of said roller blind is affixed and a contoured plate (24), said contoured plate having a curved edge (25) that is positionable relative to a top curved window edge (8) when said pull rod assembly (23) is in said functional position such that the contoured plate (24) substantially closes any light gap between the pull rod assembly (23) and the top window edge (8) when the pull rod assembly is in said functional position.

23. The motor vehicle of claim 22 in which said window is a rear window of the motor vehicle.

24. The motor vehicle of claim 23 in which said panel is a rear shelf (13) located beneath the rear window.

25. The motor vehicle of claim 24 in which said rear shelf (13) is formed with a depression (54) corresponding in shape to said contoured plate (24) for receiving said contoured plate when said pull out assembly (23) is in said rest position.

26. The motor vehicle of claim 22 in which said rectilinear rod member and contoured plate are rotated to a position for closing said pull-out slot (14) when said roller blind is in a substantially wound condition about said windup shaft.

* * * * *